3,806,324
AIR DISTRIBUTION SYSTEM FOR CATALYST REGENERATOR

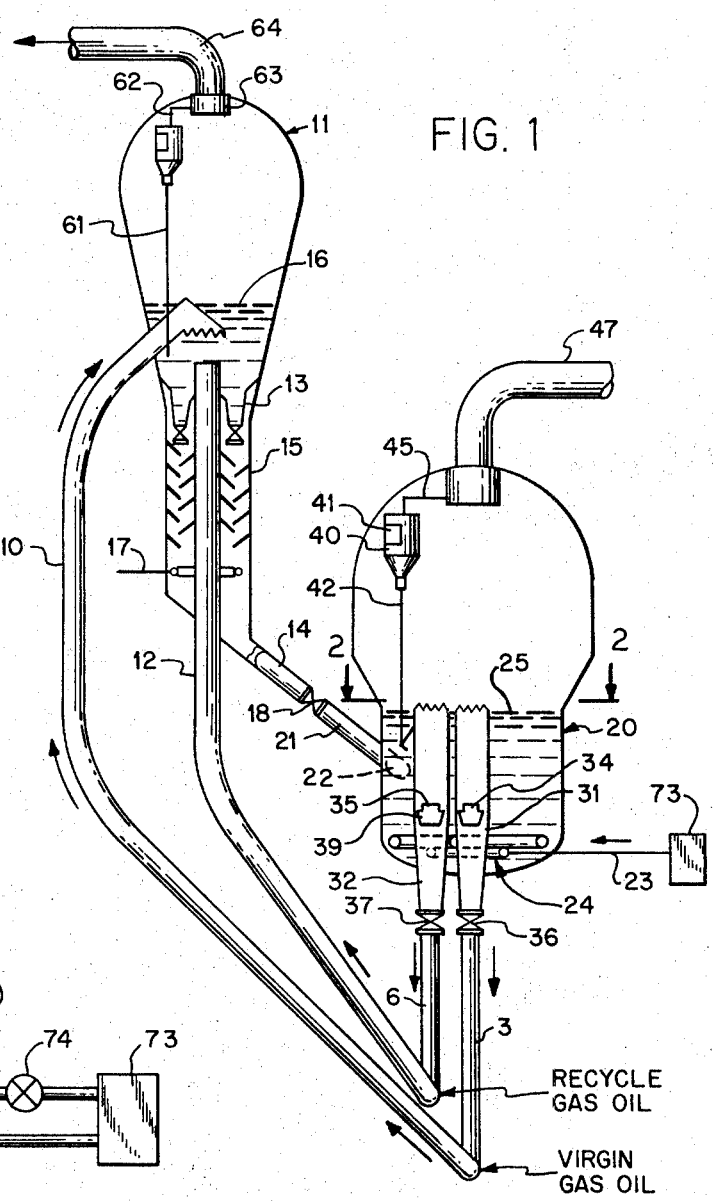
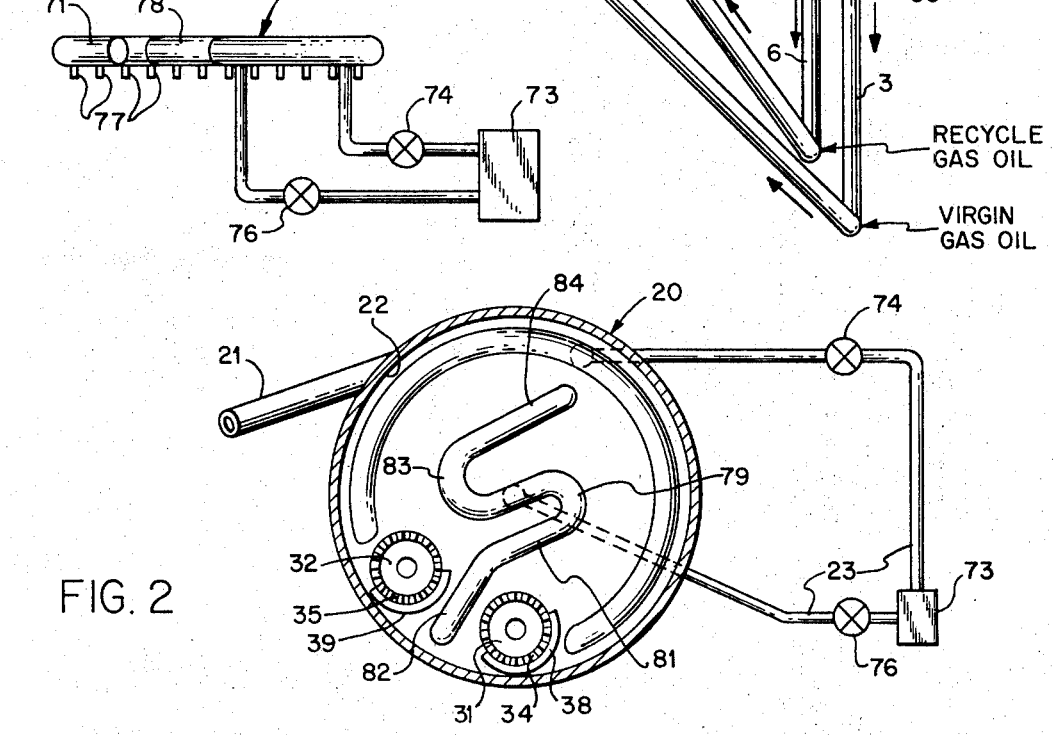

John P. Maclean, John C. Strickland, and John W. Sanwald, Houston, Tex., assignors to Texaco Inc., New York, N.Y.
Filed Nov. 11, 1971, Ser. No. 197,762
Int. Cl. B01j 9/20
U.S. Cl. 23—288 B         1 Claim

ABSTRACT OF THE DISCLOSURE

Apparatus for effecting regeneration of catalyst material in a fluid catalytic cracking process. In the latter mentioned process, a hydrocarbon material is contacted with a fluidized solid catalyst within a reaction zone whereby to effect conversion of at least a portion of said hydrocarbon material to a desired conversion product. Simultaneously, the catalyst is affected by the deposition of a layer of coke on or about the outer surface thereof. The invention relates specifically to an apparatus for regenerating the fluidized catalyst for reuse, wherein particles of the latter are transported through an elongated reaction flow path. The reaction achieved in the regenerating chamber causes the coke to be burned from the catalyst in a combustion supporting atmosphere provided by a uniform air flow introduced at the chamber lower end in a manner to avoid flow discontinuities and disturbances to the desired air stream.

---

The regeneration apparatus in general, and the process of this invention, are used in a fluid catalytic cracking system as described and claimed in U.S. Pat. 3,433,733 issued on Mar. 18, 1969 in the name of Dorrance P. Bunn, Jr., Henry B. Jones and Richard E. Nagle. It was further described in U.S. Pat. 3,394,076 issued to said Bunn and Jones respectively, said patent dated July 23, 1968.

SUMMARY OF THE INVENTION

In fluidized solids reaction vessels, the solids to be treated are normally introduced into one section of the vessel and withdrawn from another section. In the interim the solids are reacted with a gaseous medium that also serves as a fluidization vehicle. The fluidization vehicle or material is normally introduced into the lower section of the regeneration vessel through a suitable type of distributor and withdrawn from the upper portion, usually through means adapted to remove gas entrained solid material.

The degree of reaction that takes place in the regeneration chamber between the vapors and solids is normally a function of such variables as temperature, pressure and reaction time. It is also important, therefore, that the inlet solids be maintained in the reaction zone sufficiently long to permit reaction to reach a desired degree of completion.

It is further desired that to afford a more complete reaction to the coke or carbon coated catalyst particles, the latter be circulated through the regeneration chamber within a gas stream wherein gas flow discontinuities are minimized. The latter when present in a regenerating chamber causes non-uniform treating of the particles, and an overall inefficient process.

In accordance with the invention then, a combustion supporting gas, usually air, is introduced to the regenerator in a manner to assure adequate and efficient treating of the fluidized catalyst. This is achieved through the expedient of a unique gas or air distribution system comprising a plurality of manifolds arranged at the lower end of a regeneration chamber. Said manifolds are so disposed to cause a constant, relatively evenly distributed and continuous upward gaseous flow through said chamber toward the discharge section thereof.

It is an object of the invention therefore to provide a method and apparatus for regulating a spent fluidized catalyst material prior to reuse thereof in a fluid catalytic cracking process. A further object is to provide means for achieving a more uniform and efficient regeneration of a fluid catalyst by regulated distribution of a combustion supporting gas into the regeneration zone. A still further object is to provide a unique air distribution system wtihin a regeneration apparatus adapted to achieve the desired uniform regeneration step.

The invention therefor relates to an improvement in the regeneration of catalyst used in the fluid catalytic cracking process described in U.S. Pat. 3,433,733. Briefly, in said claimed process, a hydrocarbon is contacted with a fluidized or particulated solid catalyst within a reaction zone whereby to effect conversion of at least a portion of the hydrocarbon to desired conversion products. There further results the concomitant deposition of coke on the catalyst outer surface such as to decrease the effectiveness thereof. The catalyst, with the outer layer of coke, is therefore continuously removed from the reaction zone and then stripped. The stripped catalyst is then passed as a dense phase into the dense phase portion of the regeneration zone. Within the latter, the particulated catalyst is contacted with an oxygen-carrying gas to effect combustion of at least a portion of the coke coating and thereby achieving regeneration of the catalyst.

Regenerated catalyst material is thereafter continuously withdrawn from the regeneration zone and again introduced to the reaction zone. To prompt an efficient regeneration step, an uninterrupted swirling motion is induced in the dense phase bed of the regeneration zone.

Advantageously catalyst is introduced as a dense phase into the regeneration zone tangentially of the latter. Regenerated material is withdrawn from said zone at a point circumferentially remote of the point of introduction.

In accordance with the invention, the upward flow of combustion supporting material through the regeneration zone, which in this instance will be referred to as air, is achieved by so arranging the air carrying manifold system to assure the desired air flow in spite of two or more upstanding conduits disposed within the regeneration chamber.

DESCRIPTION OF THE DRAWINGS

In the drawings, FIG. 1 represents a diagrammatic flow diagram of portions of a fluid catalyst cracking unit. FIG. 2 is a cross sectional view taken along line 2—2 of FIG. 1. FIG. 3 is a segmentary view on an enlarged scale of the apparatus shown in FIG. 1. FIG. 4 is a cross sectional view on an enlarged scale taken along line 4—4 of FIG. 3.

In achieving the desired catalyst regeneration, in one embodiment of the instant invention there is included an improved apparatus for the uniform regeneration of fluidized solids catalyst. Said apparatus comprises a regeneration chamber adapted to contain a fluidized solids bed within the lower portion thereof. Means is further provided to withdraw gaseous products of combustion from the regeneration chamber. A dense phase solids input conduit is provided, being so positioned to tangentially enter the lower portion of the regeneration chamber. Means are further provided to withdraw regenerated catalyst from said chamber at a point circumferentially remote from the point where the solids in the conduit enter the said chamber.

Advantageously, means to withdraw catalyst, after the latter is regenerated, comprises a cylinder in open communication with the interior of the regeneration chamber at a point above the operating level of the fluidized bed.

The cylinder contains at least one aperture formed in its lower portion, in open communication with the interior of the regeneration chamber at a point below the operating level of said fluidized bed.

Referring to FIG. 1, a virgin gas oil in line 2, and regenerated catalyst from line 3, are introduced through a fresh feed riser 10 into reactor 11. A second feed stream in line 5, usually a recycle gas oil, and regenerated catalyst from line 6, are introduced into reactor 11 through recycle feed riser 12. In reaching reactor 11, recycle feed riser 12 passes internally through stripper 15 without being in open communication therewith, and extends into the dense phase bed which has a level 16 in the reactor 11. Products of cracking, and a small amount of entrained catalyst, leave the bed and reactor 11 at level 16 and enter the inlet of cyclone separator 60. In the latter entrained catalyst is separated and returned to the dense phase bed through dip-leg 61.

Separated gaseous products are discharged from cyclone 60 through line 62 to plenum chamber 63. The latter may also collect gaseous products from other cyclone separators not shown. Product vapors from chamber 63 are discharged through product line 64 to fractionation and recovery equipment not presently shown.

In the course of the catalytic cracking, process, and as mentioned herein, coke is deposited on the fluidized solids catalyst. The latter is moved from reactor 11 through standpipe 13, and passed to stripper 15. In the latter, entrained and occluded hydrocarbons are displaced. They are displaced by stripping steam introduced through steam ring 17. Stripped catalyst from the bottom of stripper 15 is passed through return pipe 14, slide valve 18, and returned in inlet conduit 21 into regenerator 20. Spent catalyst return inlet 21 communicates with the regenerator 20 through tangential inlet 22 in the lower cylindrical wall of regenerator 20.

A dense phase bed having an upper level 25 is maintained in regenerator 20. Return pipe 21 introduces the used catalyst below level 25. Return pipe 21 further introduces the used catalyst as a dense phase, directly into the dense phase of regenerator 20 thereby avoiding localized high temperatures which ordinarily result when oxygen rich air meets high carbon catalyst, a condition that may be encountered in transporting catalyst from a reactor to a regenerator as a suspension in the burning air.

Tangential inlet 22 introduces particulated catalyst into regenerator 20 with a horizontal component of velocity. Since the dense phase bed is confined by the cylindrical wall of vessel 20, a swirling motion is imparted to the particles. The catalyst is thereafter withdrawn from regenerator 20 through drawoff standpipes 31 and 32 which are located circumferentially remote from inlet 22. In this way, catalyst introduced through inlet 22 follows a generally peripheral path from the inlet.

In addition to the swirl established in a horizontal plane, a torroidal flow path is induced by the flow of gases into the center of the contacting zone in regenerator 20 which provides a vertical component to the particle motion. In effect, the path that the catalyst is forced to take, is elongated and the catalyst consequently has a greater dwell time for removal of coke therefrom.

Oxygen containing gas is introduced into regenerator 20 through air line 23, which is communicated in turn with air distribution system 24.

The air distribution system including both manifold segments 71 and 78, is disposed adjacent to although spaced from the lower end of regenerator 20. As shown, said first manifold segment 71 lies concentric with the circular walls of the regeneration chamber. It is further maintained in its proper spacing from the lower and side walls of said chamber by a plurality of supports connected to and extending downwardly from the manifold to the lower wall.

While the instant air distribution system is hereinafter described as comprising two discrete and separately fed manifold segments, it is understood that a plurality of said manifold segments similarly arranged to achieve the desired flow pattern, could be utilized.

Referring to FIG. 2, air distribution system 24 comprises in general, a first manifold segment 71 having a generally circular configuration and being formed of steel pipe or tubing with closed ends. The manifold is disposed adjacent to the circular chamber wall. The opposed ends thereof terminate adjacent to opposed sides of upright standpipes 31 and 32. The tube or piping used for this gas carrying purpose is of a proper grade to withstand the elevated temperature achieved within the regeneration compartment.

Referring to FIG. 3, the said first mentioned manifold segment 71 includes a vertical arm 72 which is connected to a pressurized source of combustion supporting air 73. While not presently shown in detail, the entire manifold system including the said first segment is provided with suitable valving means such as 74 and 76 at the inlet end thereof to regulate the air flow as desired.

Preferably said regulation is achieved through automatically operated controls disposed remotely to regenerator 20. The controls are so regulated to achieve the desired uniformity of temperature, pressure and density within the catalyst bed during the regeneration stage of the process, and are responsive to changes in said conditions.

Referring to FIGS. 3 and 4, the lower face of said first manifold segment 71 is provided with a plurality of discharge orifices 77, so disposed and aligned to achieve the desired uniformity in air flow. The respective orifices 77 are arranged in a plurality of parallel rows extending substantially the entire length of said manifold segment 71. The orifices 77 are preferably spaced equally apart and of equal diameter. It is appreciated however, that the spacing and size of the orifices can be adjusted to assure the desired flow characteristics therethrough.

Referring to FIG. 4, each of said air adjusting orifices 77 comprises a short length of pipe or tubing directed downwardly from the manifold lower side and transversing the lower wall thereof. Each of said orifice pipes 77 is provided with an inlet port 79, so shaped as to best receive a flow of air directed through the manifold. Each of said air inlet ports is beveled at a 45° angle to the normal flow of air through the manifold passage.

Second manifold segment 78 comprises a serpentine-like member which is disposed substantially tranversely of the regenerator chamber and having a portion thereof intruding intermediate the upstanding standpipes 31 and 32. As seen in FIG. 1, the respective first and second manifold segments 71 and 78 preferably occupy a mutual horizontal plane. However, this does not constitute an essential relationship since the manifolds can be spaced vertically apart and yet achieve as an overall result the desired uniform air flow.

Said second manifold segment 78 includes a generally circular portion 70 commencing at or near the center of the regenerator chamber and defining an arcuate segment of approximately 270°. Said segment 70 can be readily formed by three end connected, 90° elbow sections which terminate at a point spaced radially from the regeneration chamber center. An additional section 81 of the segment 78 comprises a 90° curved elbow end connected to said first segment portion 70. Said latter mentioned elbow includes an elongated straight run 82 which extends approximately centrally of the space defined intermediate vertical standpipes 31 and 32.

The remaining ends of said manifold segment 78 comprises a circular portion 83 of approximately 225°, extending from section 79 and formed of elbow shaped pipe sections which terminate outwardly from the regenerator chamber axial center. Said latter mentioned section 83 is further provided with a straight, extended portion 84 directed toward the chamber outer edge.

As shown, said second manifold segment 78 is spaced inwardly from the first manifold segment 71. Further, said second manifold segment 78 is also provided with a plurality of air orifices which extend from the lower side thereof and are so arranged to achieve the desired uniform air flow through the regeneration chamber. Thus, and as noted with respect to first manifold segment 71, said orifices comprise similarly disposed short lengths of pipe such as 79, which are so contoured at the inlet port thereof to best receive and redirect a flow of air passing through the manifold.

To achieve an optimum air flow to second manifold segment 78, the latter is provided with a valved duct or similar means which in turn is communicated with the pressurized air source 73. Said duct is of course provided with air flow regulation means as mentioned such as valving or other appropriate device which is preferably automatically operable and responsive to conditions within the regenerator bed to achieve the desired air flow.

The positions of manifold segments 71, 78, or others that may be specified, with respect to each other and the regenerator walls, and the distribution and size of air orifices 77, are determined to effect, preferably, an evenly distributed air flow through a horizontal cross-section of the regenerator. It is recognized also that the positions of the respective manifold segments can be adjusted to effect a specified uneven flow of air through the cross-section of the regenerator as a further improvement.

In achieving the optimal operation in the process, catalyst particles coming through the tangential inlet 22 are suspended in the gas within regenerator 20. The resulting suspension thus exhibits many of the characteristics of a fluid. Coke or other carbonaceous material carried on the catalyst particles outer surface is burned away by the oxygen in the regeneration gases.

The treated and carbon-free catalyst is withdrawn from regenerator 20 through drawoff standpipes 31 and 32. Standpipe 31 communicates through slide valve 36 and standpipe 3, with fresh feed riser 10. Standpipe 32 communicates through slide valve 37 and standpipe 6 with recycle feed riser 12. Drawoff standpipes 31 and 32 are in open communication at their respective upper ends with the interior of the regeneration chamber. Said standpipe upper ends are disposed for optimal functioning at the top of dense phase 25 of the fluidized bed therein.

Preferably, the tops of the respective drawoff standpipes 31 and 32 are serrated whereby the effects of fluctuation in the bed level are minimized.

Apertures or windows 34 and 35 are provided in the lower portions of drawoff standpipes 31 and 32 respectively. Windows 34 and 35 are located in their respective standpipes so that they occupy less than 180° of the circumference of the standpipe. They are preferably located so that they face away from inlet 22, the point where the spent catalyst return pipe 21 enters regeneration chamber 20. In this way the portion of the respective standpipes behind the windows acts as a shroud to prevent bypassing of catalyst directly from the inlet to the outlet standpipe.

To funnel a greater amount of catalyst through the windows 34 and 35 as described above, baffles or scoops 38 and 39 are affixed respectively to the drawoff standpipes 31 and 32 at the bottom of the windows 34 and 35. These baffles flare upwardly and outwardly from the base of each window 34 and 35 to an elevation somewhat below the top of the windows. Solids separating in the disperse phase of the contacting zone tend to fall downwardly at the walls of the contacting zone. Scoops 38 and 39 are thus provided at the bottom of the drawoff hopper windows to receive the downwardly circulating catalyst and direct the descending catalyst into the drawoff hoppers 31 and 32. Scoops 38 and 39, at the same time, deflect rising gases away from the drawoff windows. They thus serve as a funnel for downwardly traveling catalyst particles, thereby directing a larger and more continuous flow of catalyst particles through the windows. These baffles also deflect the upwardly traveling regeneration gases away from the windows so that they are prevented from entering therein.

Combustion gases leaving the dense phase bed at level 25, together with entrained catalyst, pass through the disengaging space in the upper portion of regeneration 20 to gas-solids separating cyclone 40 having inlet 41. Cyclone inlet 41 is oriented to receive gases rotating in the same direction as the catalyst particles introduced into regenerator 20 through inlet 22 without reversal of direction.

Although, only a single cyclone is shown in FIG. 1, it will be understood that a plurality of cyclones may be assembled to provide two or more stages of separation, and a plurality of single or plural stage assemblies may be employed depending upon the gas handling capacity of the particular cyclone system employed and the total amount of gas to be handled.

Solids separated in cyclone 40 are returned to the bed in regenerator 20 by cyclone dip-leg 42. Dip-leg outlet 43 is oriented to direct such return solids in the direction of swirl of catalyst introduced through tangential inlet 22. Surprisingly, the amount of solids separated from the effluent gases by cyclone 40 may exceed the amount of catalyst circulated from reactor 11 to regenerator 20 through inlet line 21. Typically the catalyst returned through the dip-leg 42 may be about 120 percent of the catalyst circulated through the dense phase inlet line 21, and so the return of this catalyst in the direction of the swirl substantially augments the swirling flow. Gases from cyclone 40 are passed through line 45 to plenum 46 and conduit 47 which may also receive effluent gas from other cyclones not shown.

Other modifications and variations of the invention as hereinbefore set forth may be made without departing from the spirit and scope thereof, and therefore, only such limitations should be imposed as are indicated in the appended claim.

We claim:

1. In a catalyst regenerator for a fluidized catalyst cracking unit, said regenerator including; means to introduce and remove fluidized catalyst therethrough, an upright cylindrical wall regeneration chamber having opposed upper and lower ends in which chamber said fluidized catalyst is regenerated by a combustion treatment, said chamber lower end being generally concave in configuration, and a pair of vertically arranged standpipes extending upwardly from said concave lower end and being spaced slightly from said cylindrical regenerator wall, and means for introducing a combustion supporting gaseous medium into said regenerator chamber, including:

a gas distribution system disposed at the lower end of said regeneration chamber and comprising, a plurality of manifold members having a gas inlet means, and a plurality of gas discharge ports communicated therewith, at least one of said plurality of manifold members including a circular manifold segment disposed adjacent to the cylindrical wall of said regeneration chamber, the respective ends of said circular segment terminating adjacent to said pair of vertically arranged standpipes, and a second manifold segment spaced inwardly of said at least one manifold segment, and being formed in a serpentine configuration extending transversely of said regeneration chamber, a portion thereof being disposed intermediate the respective vertically arranged standpipes, discharge ports in the respective plurality of manifold segments including a short pipe section at each of said discharge ports extending downwardly from the manifold toward said regeneration chamber concave lower end in a direction parallel to the longitudinal axis of said cylindrical wall regeneration chamber, whereby to direct streams of said gas downwardly against said chamber's concave lower end.

References Cited

UNITED STATES PATENTS

| | | | |
|---|---|---|---|
| 3,394,076 | 7/1968 | Bunn, Jr. et al. | 208—164 |
| 2,454,373 | 11/1948 | Blanding | 252—417 |
| 3,563,911 | 2/1971 | Feiffer et al. | 252—417 |
| 2,626,247 | 1/1953 | Hart | 23—288 S X |

JAMES H. TAYMAN, Jr., Primary Examiner

U.S. Cl. X.R.

23—288 S; 208—164; 252—417, 419